US010825281B1

(12) United States Patent
Walters et al.

(10) Patent No.: US 10,825,281 B1
(45) Date of Patent: Nov. 3, 2020

(54) SYSTEM AND METHOD FOR LOW ENERGY CREATION OF DYNAMIC CREDIT CARD NUMBERS BETWEEN PURCHASES

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/518,358

(22) Filed: Jul. 22, 2019

(51) Int. Cl.
*G06Q 20/34* (2012.01)
*G07F 7/10* (2006.01)
*G07F 7/08* (2006.01)
*G06K 19/077* (2006.01)

(52) U.S. Cl.
CPC ..... *G07F 7/1008* (2013.01); *G06K 19/07703* (2013.01); *G06Q 20/341* (2013.01); *G07F 7/0893* (2013.01)

(58) Field of Classification Search
CPC .... G06Q 20/105; G06Q 20/34; G06Q 20/341; G06Q 20/357; G06Q 20/3572; G06Q 20/38; G06Q 20/385
See application file for complete search history.

(56) References Cited

U.S. PATENT DOCUMENTS

| | | | | |
|---|---|---|---|---|
| 4,100,689 A | * | 7/1978 | Broune | G06Q 20/347 283/73 |
| 4,899,038 A | * | 2/1990 | Rearigh | G06K 19/06187 235/450 |
| 5,061,844 A | * | 10/1991 | Solo | G06K 19/10 235/380 |
| 5,585,787 A | * | 12/1996 | Wallerstein | G06Q 20/3415 235/380 |
| 5,627,355 A | * | 5/1997 | Rahman | G06K 19/07 235/375 |
| 7,051,929 B2 | | 5/2006 | Li | |
| 7,591,416 B2 | * | 9/2009 | Blossom | G06K 19/06187 235/380 |
| 7,793,851 B2 | | 9/2010 | Mullen | |

(Continued)

FOREIGN PATENT DOCUMENTS

WO 00/49586 8/2000

OTHER PUBLICATIONS

Kagan, J. "Chip Card," (2018) Investopedia [online] Retrieved from Internet URL: https://www.investopedia.com/terms/c/chip-card.asp—8 pages.

*Primary Examiner* — Thien M Le
*Assistant Examiner* — April A Taylor
(74) *Attorney, Agent, or Firm* — Hunton Andrews Kurth LLP

(57) ABSTRACT

Embodiments of systems and methods for a method to create dynamic physical representations of card numbers between purchases are described. The systems and methods may allow for the dynamic generation of numbers between purchases, responsive to a request received by a card, based on time-based rules, or other security, geo-location, or other rules. Embodiments of the systems and methods can allow for the synchronization of the current physical state of the card with a central server, and for a tally to be kept between the central server and the representation contained on a state of a transaction card.

20 Claims, 9 Drawing Sheets

(56) References Cited

U.S. PATENT DOCUMENTS

| | | | |
|---|---|---|---|
| 7,899,753 B1* | 3/2011 | Everhart | G06Q 20/0855 |
| | | | 705/67 |
| 8,302,872 B2 | 11/2012 | Mullen | |
| 8,494,959 B2 | 7/2013 | Hathaway et al. | |
| 8,622,308 B1* | 1/2014 | Field | G06Q 20/357 |
| | | | 235/379 |
| 10,331,989 B1* | 6/2019 | Benkreira | G06K 19/06196 |
| 2011/0062242 A1* | 3/2011 | Cowcher | G06K 19/07327 |
| | | | 235/492 |

* cited by examiner

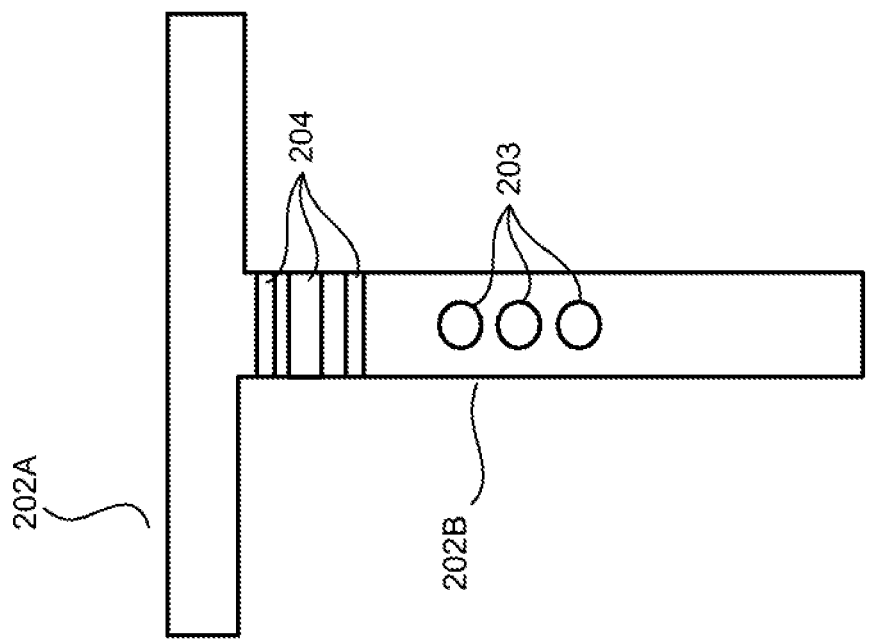

US 10,825,281 B1

SYSTEM AND METHOD FOR LOW ENERGY CREATION OF DYNAMIC CREDIT CARD NUMBERS BETWEEN PURCHASES

FIELD OF THE INVENTION

This disclosure relates to dynamically changing the physical representation of data, such as a number or name on a smartcard, in response to a command external to the card or predetermined criteria, and more specifically, to systems and methods for creation of dynamic physical representations of card numbers.

BACKGROUND

Instruments that physically represent a user account, such as an identity card, a credit card, a debit card, or a personal identification card, are static and issued on immovable or immutable mediums, such as plastic credit cards or ink permanently printed onto a physical medium. One example of such a system is a smartcard. Another example of such a static system is a credit card number printed onto a credit card. At times, these instruments become compromised, requiring a change in the physical representation of a user account. In one example, a credit card number may require a change if for example, the credit card number becomes compromised. Traditionally, the old credit card would be deactivated, and a new credit card, with a new credit card number, would be physically issued. A user of the instrument would have to wait for the new credit card to be processed, generally from a central location, and await for it to be shipped, before the user could begin using the instrument. Further, traditional instruments are static, increasing the odds that the instrument would be compromised over time. In addition, traditional methods of mutating a semi-permanent object generally involve high-energy, a persistent energy source, are insecure, or require expertise in manipulation of the object.

Accordingly, a need exists for the ability to use a low-energy system or method to provide the ability to mutate an instrument, such as a physical card with numbers, exists in a secure, low-cost, and instantaneous manner.

SUMMARY

Therefore, it is an object of this disclosure to describe a system, method and computer-accessible medium to securely, dynamically modify, mutate, create or destroy the physical representation of information representing a user account, such as for example an identity number, name, alphanumeric identifier, or number, such as a card number.

Embodiments of the present disclosure provide a method, comprising: receiving, on a card, a command to configure a physical representation of data wherein the representation is an alpha-numeric string and the card has one or more physical elements constituting the representation of data; processing the command to generate instructions corresponding to movement of the one or more physical elements constituting the representation of data; responsive to the instructions, instructing a mechanism to move the physical elements constituting the representation of data; and moving the physical elements via the mechanism through mechanical or electromagnetic manipulation of the position of the physical elements.

Embodiments of the present disclosure provide a system, comprising: a card; one or more physical elements constituting a physical representation of information on the card; a mechanism configured to move the physical elements; and an electronic chip configured to: automatically receive from a first device a command to configure a physical representation of information; process the command to generate instructions corresponding to movement of one or more elements constituting the physical representation of information; and instruct a mechanism to move elements constituting the physical representation of information; and a mechanism configured to: alter the position of one or more of the physical elements constituting the physical representation information data via mechanical or electromagnetic means.

Embodiments of the present disclosure provide a non-transitory computer-accessible medium having stored thereon computer-executable instructions, wherein, when a computer arrangement executes the instructions, the computer arrangement is configured to perform procedures comprising: receiving, on a first device, a command to configure a representation of data; processing the command to generate instructions corresponding to movement of one or more elements constituting the physical representation of data; responsive to the instructions, instructing a mechanism to move elements constituting the physical representation of data; and storing a history of commands received and configurations altered.

BRIEF DESCRIPTION OF THE DRAWINGS

FIG. 2B illustrates an example embodiment of a pin of the present disclosure.

DETAILED DESCRIPTION

Figure 1:
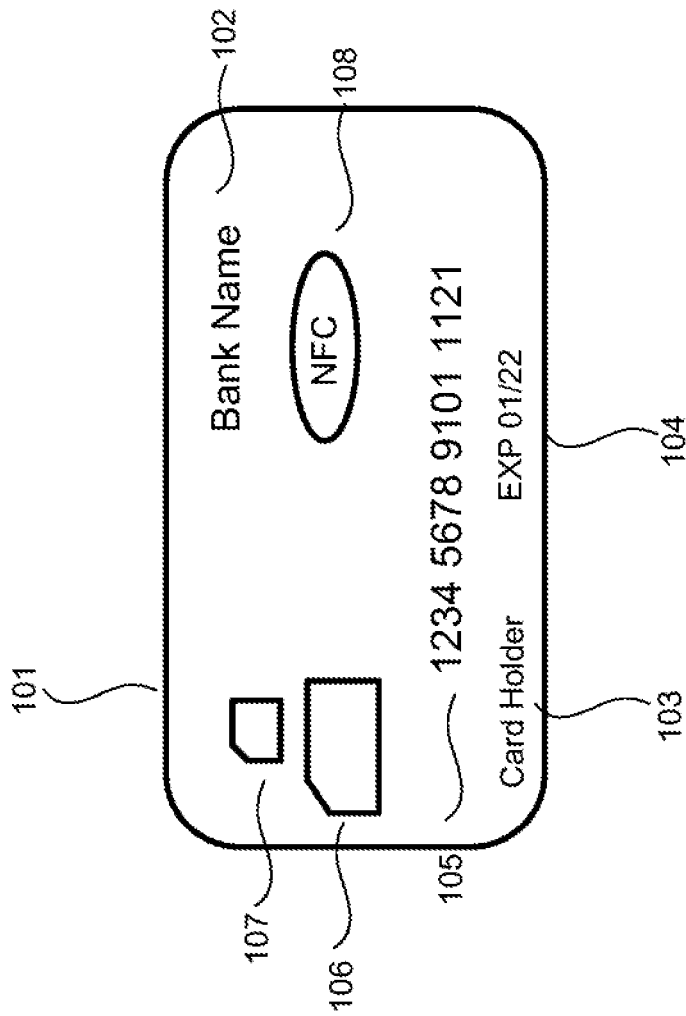
FIG. 1 illustrates an example embodiment of a smartcard known in the art.

FIG. 1 illustrates an instrument known in the prior art. The instrument can be a transaction card, for example, a credit card, 101. Credit card 101 can be made of any suitable material, such as for example, a plastic resin known as polyvinyl chloride acetate. Other materials can also be used, such as for example, other plastics, metals, carbon, biodegradable composites or celluloid materials can be used. Credit card 101 can also contain an identifier of the issuer of the card, such as for example, bank name 102. Bank name 102 can be an abbreviated version of a retail entity that issues a card. Credit card 101 also may have a card holder name, 103. Card holder name 103 may be the name of the account owner or user. Card holder name 103 can also be the name of an individual associated with the account in some manner, such as for example a trustee or additional card holder for the account.

Credit card 101 can also display an expiration date 104, upon which the credentials represented by the card expire.

The expiration date 104 can also be some other temporal piece of information related to the operation of credit card 101. Credit card 101 can further contain, for example, an alphanumeric string representing a card number 105. Card number 105 can be for example a 16 digit number which is one representation of a user account and can be used to identify one or more users. Card number 105 can also be encoded in any conventional method. For example, card number 105 can be configured in a manner such that the first 6 or 8 digits of the card number 105 (such as the BIN number) represent an institution with which card 101 is associated.

Card 101 can further have a chip 106. Chip 106 can act as an electronic medium which can interface with other devices, such as for example, a point of sale (PoS) device, a register or a card reader, such as for example, those capable of being plugged into or otherwise coupled to a mobile device, to transfer other information. Chip 106 can additionally contain other capabilities, such as for example, the capability of storing, sending, and receiving information. Chip 106 can further contain the ability to wirelessly transfer information. Card 101 can further contain a memory 107, which can include information about the card, security protocols, algorithms, or other information which is required to operate card 101. For example, encryption and decryption algorithms can be included on card 101 to enable a secure operation of the card. Card 101 can also include a wireless interface, such as interface 108. Interface 108 can be of any suitable type of medium to allow for wireless communication, such as for example, a near-field communication interface.

Figure 2A:
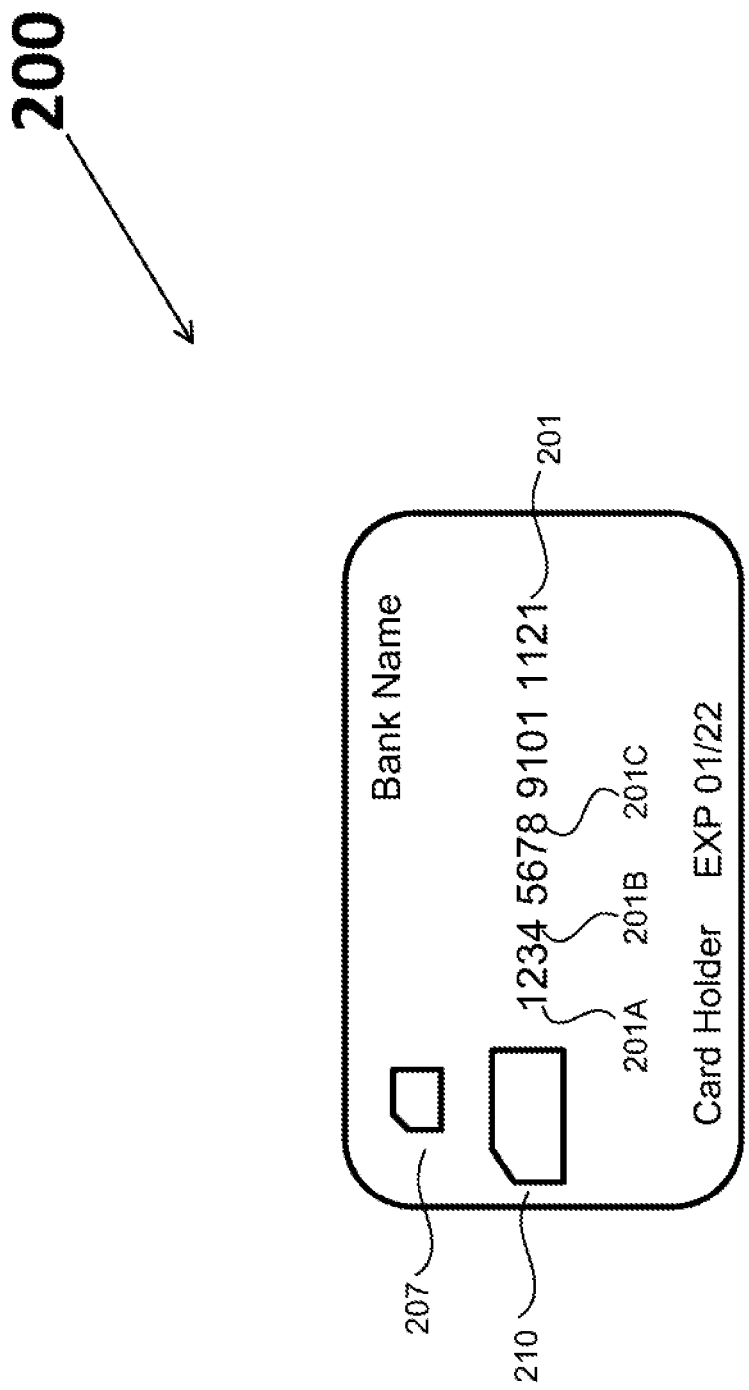
FIG. 2A illustrates an example embodiment of a smartcard of the present disclosure.

FIG. 2A illustrates a card 200 according to an embodiment of the present disclosure. Card 200 may be similar to card 100 in that it may include many elements of a conventional credit card described above. For example, card 200 can contain a chip 210, memory 207, and interface 240. According to an embodiment of the disclosure, card 200 can also contain an alphanumeric string 201, representing a card number, similar to that of alphanumeric string 105. Alphanumeric string 201 can be composed of individual components, or individual digits, such as digit 201A, digit 201B, and digit 201C (shown in FIG. 2A as "1", "4", and "8", respectively). Digit 201A, digit 201B, and digit 201C, can be composed of any synthetic or natural script which can be capable of representing a machine or human-readable element of language or script, such as for example, a number, character, glyph, or pictogram. Digit 201A, digit 201B, and digit 201C need not be limited to numerical digits. Although digit 201A, digit 201B, and digit 201C are shown as components of alphanumeric string 201, any alphanumeric string contained on card 200 can be composed of a suitable number of digits. For example, the name of the credit card holder, or the expiration date, on card 200 can be composed from a suitable number of elements. Other elements, such as for example a special character (e.g. a dash, an em-dash, a parenthesis or a back-slash) can also be represented by a digit.

Digits, such as digit 201A, digit 201B, and digit 201C, may be representable by one or more pins that can further be mutable, to represent a new character, number, or other element of script, upon receiving suitable instructions. These instructions can be received through, for example, a near-field communication (NFC) message containing suitable encryption and security protocols. In another example, the message could be delivered through chip 210. In an example embodiment, the message could contain details about which alpha-numeric string to represent, and instructions on how the pins of the card, detailed below, should be modified. Although FIG. 2A and the related description only reference three of the digits (201A, 201B, and 201C) in card number 201, it is to be understood that all or each of the digits in card number 201 may be representable as pins as shown and described herein. For example, in some embodiments, all of the digits in card number 201 may be representable as pins. Additionally, in some embodiments where, for example, a BIN number remains static, the account number (e.g., the last 8 or 10 digits of card number 201) may be representable as pins as shown and described herein.

Chip 210 can further contain processing circuitry such as a microprocessor and a memory. The processing circuitry may contain additional components, including processors, memories, error and parity/CRC checkers, data encoders, anticollision algorithms, controllers, command decoders, security primitives and tamperproofing hardware, as necessary to perform the functions described herein.

FIG. 2B illustrates an example embodiment of a pin 202. Digits, such as digit 201A, digit 201B, and digit 201C are composed of pins, such as pin 202. Pin 202 can be in a 'T' shape, wherein the two pieces composing the pin are substantially perpendicular to one another. In such an example embodiment of pin 202, one piece of the pin can be raised above the credit card surface to represent part of a digit, such as viewing part 202A, while the other part of the pin acts as an axis along which the pin can be rotated or raised, such as a rotational part 202B. Rotational part 202B can further be composed of suitable materials, or contain constitutional elements, which are electrically or magnetically reactive, to allow for the rotation of pin 202 to occur, or for pin 202 to be raised or lowered relative to the surface of card 200. In an example embodiment, the surface of pin 202 can contain an electrically charged material, such as an electric wire mesh, which can be pushed or pulled by a suitable application of an external force. Further, pin 202 can in rotational part 202B, contain embedded magnets 203, 204, such as permanent magnets or electromagnets, which can be manipulated through a suitable application of an external magnetic field, or through the application of an electric current, to push, pull, and rotate pin 202.

Figure 2C:
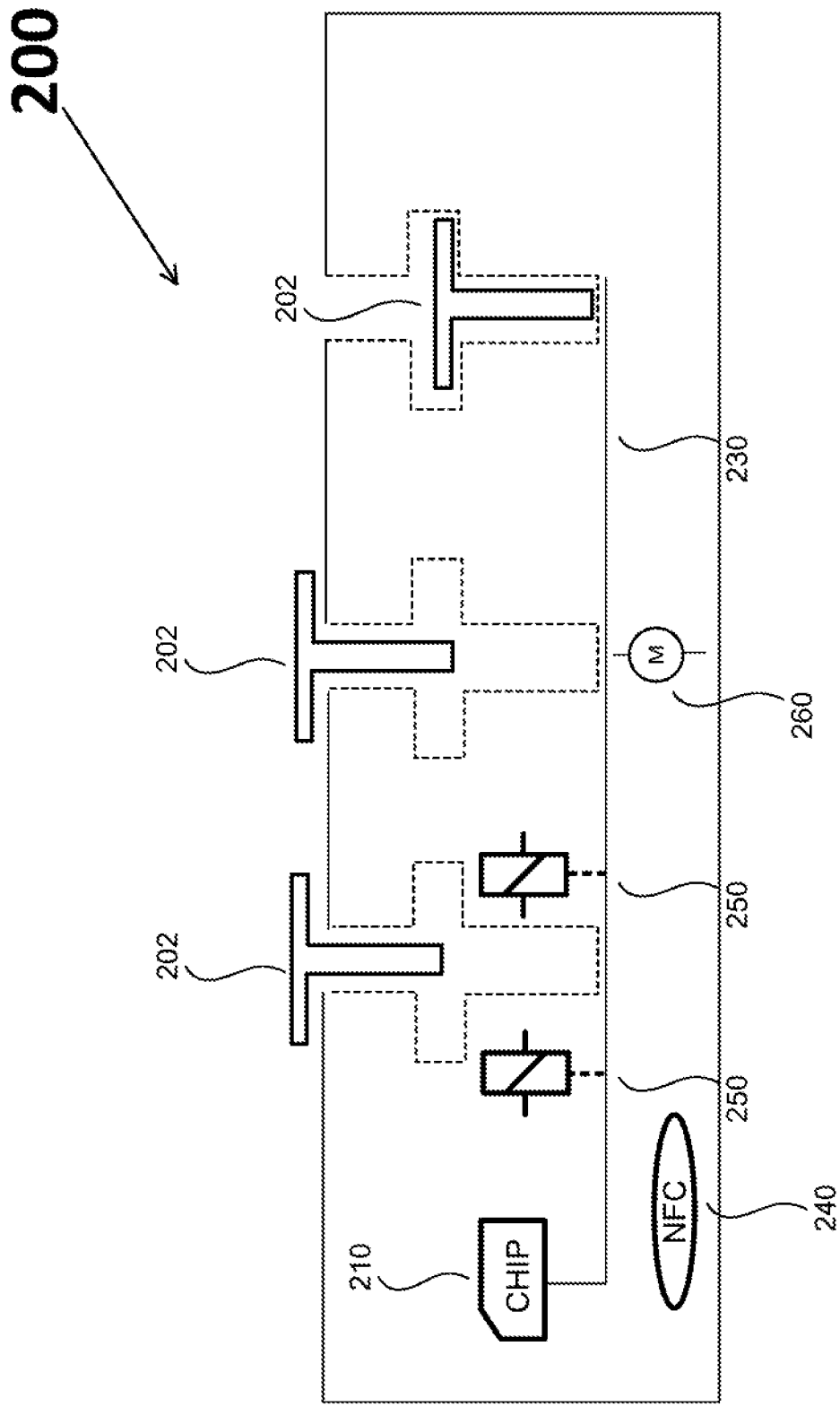
FIG. 2C illustrates an example embodiment of a cross sectional view of a smartcard of the present disclosure.

FIG. 2C illustrates a cross-sectional, side view of an example card 200. FIG. 2C is illustrative of the various components contained in an example card 200. FIG. 2C illustrates a card 200 with an upper surface and a lower surface, a chip 210, a circuit 230, an interface 240 acting as a communication medium, electromagnet 250 and a micromotor 260. The interface 240 acting as a communication medium can include other technology such as for example, Wi-Fi, WLAN, RF, radio, IR, and Bluetooth, or any combination thereof or any other appropriate architecture or system that facilitates the communication of signals, data, and/or messages. Similarly, any suitable hardware level and software level algorithm may be chosen to allow for the transfer of data on card 200.

FIG. 2C further illustrates one or more pins, such as pin 202. Pin 202 can be raised, lowered, and rotated relative to card 200. This can be done via electromagnet 250. In an example embodiment, electromagnet 250 can be electrically charged or operated to create an electromagnetic force, which can in turn raise, lower, or rotate pin 202 in cooperation with, for example, embedded magnets 203, 204. Thus, in this manner, pin 202 can be raised or lowered relative to surface of card 200. Further, once raised, the pins are capable of being locked. In another example, a mechanical motor, such as micromotor 260 can be attached physically to the bottom of a pin 202. The motor can be capable of raising, lowering, and rotating the pins to allow for the pins to be raised and lowered relative to the surface of the card, and be locked. The present disclosure is not limited to the above-mentioned motors, and it is understood that any type of motor, such as brushed motors, brushless motors, direct drive motors, linear motors, and servo motors, for example, can be included.

In an example embodiment, pin 202 can be suitably made of one or more materials with various optical properties and characteristics to be more or less visible to the user of the card. For example, if a pin is in a depressed position relative to the surface of the card, the pin may be suitably hidden within the depression, and only a portion of the pin would be visible to the user of the card. Further, an even smaller portion of the pin would be visible to the user if the pin is rotated when in a depressed position. By using a suitable material on the portion visible in this position, the visibility of this portion of the pin could further be reduced. For example, a material which absorbs more light could be used in order to make less visible a sub-portion of the upper part of the pin 202 (that is, part 202A as shown in FIG. 2B).

In an example embodiment, a user can use his or her card 200 by inserting it into, for example, a card reader or card interface, such as an ATM machine, a payment processor, or identity card reader. For example, the card 200 can interface with the machine through the magnetic stripe on the card being read or the EMV chip (e.g. chip 210) being read by a terminal. The machine can in turn be in communication with the issuer of the card 200, such as a payment processor for example. The issuer of the card 200 can in turn, upon receiving information, processing, or otherwise detecting a use of the information of the card 200, send an electronic message through the card reader to the card 200 with instructions for the card to rotate a physical representation of data (such as for example, 201). This information can be stored on the card 200, such as on the chip 210. The card can, upon receipt of the instructions, direct individual pins to move to change information represented on the card, such as an identity or expiration date via circuit 230.

As described above, the instructions can direct individual pins to move some or all of the information on the card. This information may include, for example, some or all of the numbers that represent the card number, expiration date, and/or card verification value (CVV) code, or any other like numbers. This information can be encrypted, for example, to ensure that only authorized entities can change the information represented on card 200. For example, the instructions may be transmitted to card 200 from a device in an encrypted manner as shown and described in U.S. patent application Ser. No. 16/205,119, the entire contents of which is incorporated herein by reference.

In some examples, the card reader or card interface can perform the movement operation after a transaction involving the card 200 has been completed and upon receipt of a new card number for the card. The card reader or card interface device can supply the energy necessary to perform this operation, and in some examples, the card reader or card interface device can control the necessary circuits inside card 200 to perform the operation. In other examples, the card 200 itself can use an internal microcontroller to perform the operation.

In some examples, the pins can be magnetized, without an electrical current running through them. By doing so, the stability of the card and the stability of the pins can be increased when locked without requiring the additional supply of energy.

The card 200 can be energized in a variety of manners. For example, the card 200 can be energized by the card reader to enable it to power the rotation of pins, such as pin 202, via micromotor 260 or electromagnet 250. For example, an external magnetic field can energize the electromagnets through inductance, or electricity can be sent through the chip 210 to energize the card. This can include powering the charge through a communication field generated by the card reader, such as a near-field communication field.

In another example, card 200 can have an internal power source, such as a battery. The battery can be charged kinetically or be powered mechanically through capturing the motion of movement of the card 200.

In another example embodiment, card 200 can be charged using wireless charging, such as via the Qi wireless charging standard, which is an open interface standard that defines wireless power transfer using inductive charging. Other standards of wireless charging can be used to charge or otherwise energize card 200.

In another embodiment, other sources of energy, such as solar energy, or energy captured from photons, can be used by the card. For example, a card can be made of a plastic material which also captures solar power, or through embedded solar cells, which transfer electrical power through the circuit.

For example, this energy can be stored within the card 200 in a mechanical or electrochemical manner, through capacitors, or can be used contemporaneously to conduct the functionality described herein. Due to energy efficiency concerns (e.g., transfer losses and storage limitations), availability and duration of charging opportunities, and card usage that may be frequent and/or irregular, it is desirable to minimize energy usage and implement low-energy mechanisms where possible.

In addition, example embodiments of the present disclosure advantageously reduce energy usage by using circuitry internal to card 200 to perform the pin rotation. For example, the card 200 can use a first current to unlock the pins and a second current to rotate the pins. After the supply of the second current, there can be no need to deliver further current to the pins beyond the current created by magnetism.

Figure 2D:
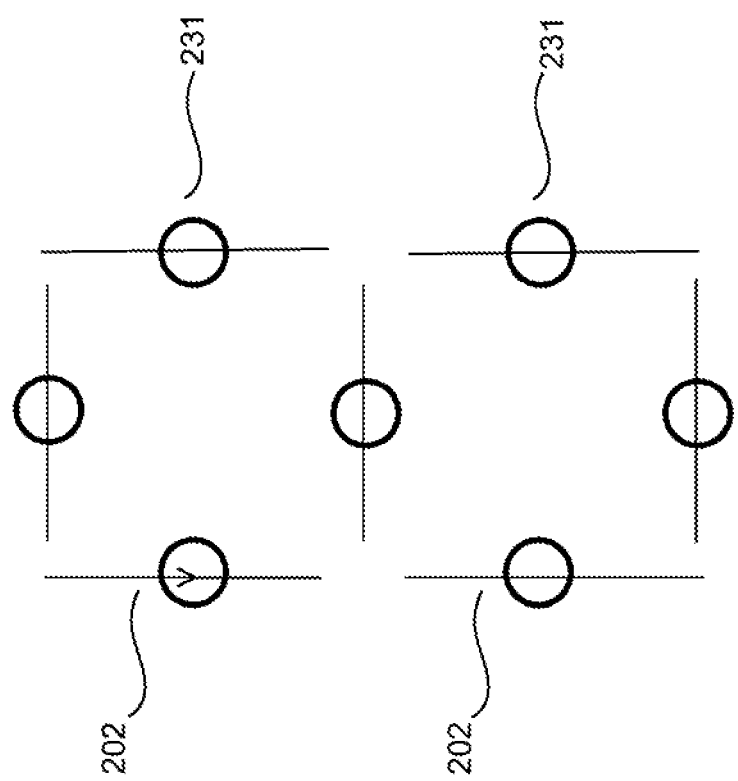
FIG. 2D illustrates an example embodiment of pins and circuit elements of a smart card of the present disclosure.

FIG. 2D illustrates an example embodiment by which pins can be arranged in order to illustrate an alphanumeric string, or other character, symbol, or other human-legible representation, such as arrangement 232. In this example embodiment, 7 pins are arranged in a figure-8 shape, allowing pins 202 to represent numbers 0-9, and roman letters a-z or A-Z. Thus, by rotating and/or raising and lowering the pins, certain pins cannot be visible to the user, and thus represent a different digit.

FIG. 2D also illustrates circuit elements 231. These circuit elements can be connected to the pins and used to calculate the current position of a pin. The circuit elements can contain suitable mechanical and electrical components to achieve this. In one example, the circuit element can contain a gear which can detect the degree of rotation of a pin as well as whether the pin is depressed into the card or on the surface of the card. The circuit elements can be connected to the circuit 230 shown in FIG. 2C which in turn is connected to chip 210. Chip 210 can advantageously use this information to, for example, verify the current state of the pins and the representation created thereby. Chip 210 can thus verify that the credit card is in fact illustrating the number that is stored on the credit card.

The circuit elements can create a current sufficient to unlock, and then rotate, the pins. For example, one or more circuit elements can push one or more pins up or down by running vertically, can rotate one or more pins by running left or right, can rotate one or more pins by running up or down, and can rotate one or more pins 45 degrees by running up or down and left or right simultaneously. In addition, one or more circuit elements can pull one or more pins to lock the one or more pins into place.

Figure 3:
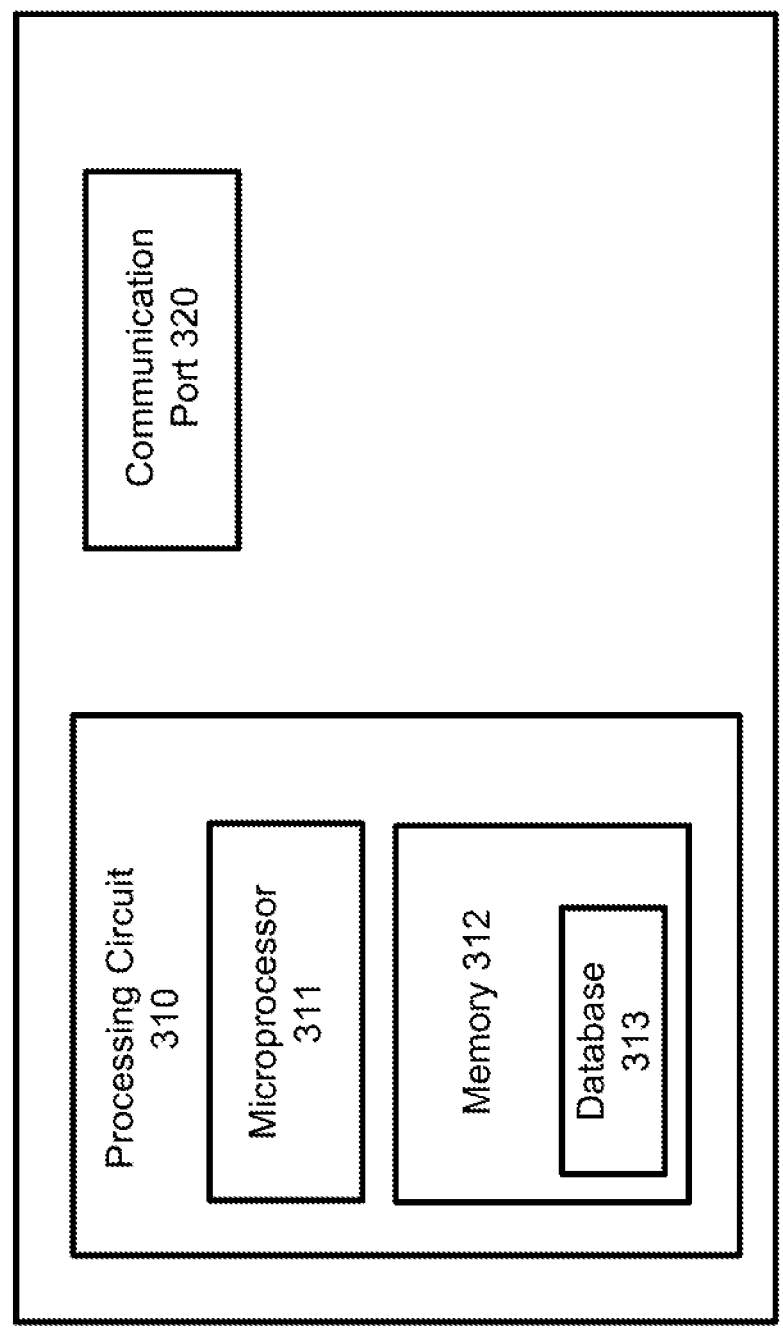
FIG. 3 illustrates an example embodiment of a server of the present disclosure.

FIG. 3 illustrates a server 300 according to an example embodiment. Server 300 may contain processing circuitry 310. Processing circuitry 310 may contain a microprocessor 311 and memory 312. The memory may contain a database 313. Database 313 may be a relational or non-relational database, and may contain a list of user identifiers and associated financial information related to those user identifiers. Server 300 may also contain a communication port 320. Communication port 320 may allow for both wired and wireless transmission of information. A credit card 200 (as illustrated in, for example, FIGS. 2A-2D) may synchronize with server 300. One method would be a physical connection, such as a USB, Firewire, or Ethernet. Other methods of transferring data, such as wireless communication, described supra, also are available to achieve synchronization. In an embodiment, server 300 may be a physical device at a financial institution, or included within the physical device, such as an Automated Teller Machine. Server 300 also could be a physical device dedicated for the purpose of synchronizing with carrier devices.

In an example embodiment, when server 300 is, or is included within, an Automated Teller Machine, server 300 can energize the credit card's electromagnets through an external electric field in order to change the credit card number and cause the change to be recorded in the memory of card 200. The ATM machine could for example accept the card, send instructions to the card through the chip 210 of the card (e.g., card 200), provide sufficient energy through an electric current or external magnetic field to the card (e.g., card 200), allow the card to change the representation of the card number or other data on the card, receive from chip (e.g., chip 210) a message indicating the current state of the card, and store the last state of the card into the ATM's memory. In case an error was encountered while changing the physical representations on the card, such as for example damage to a pin of the card, this error could be recorded by the ATM and another card issued automatically to the user.

Figure 4:
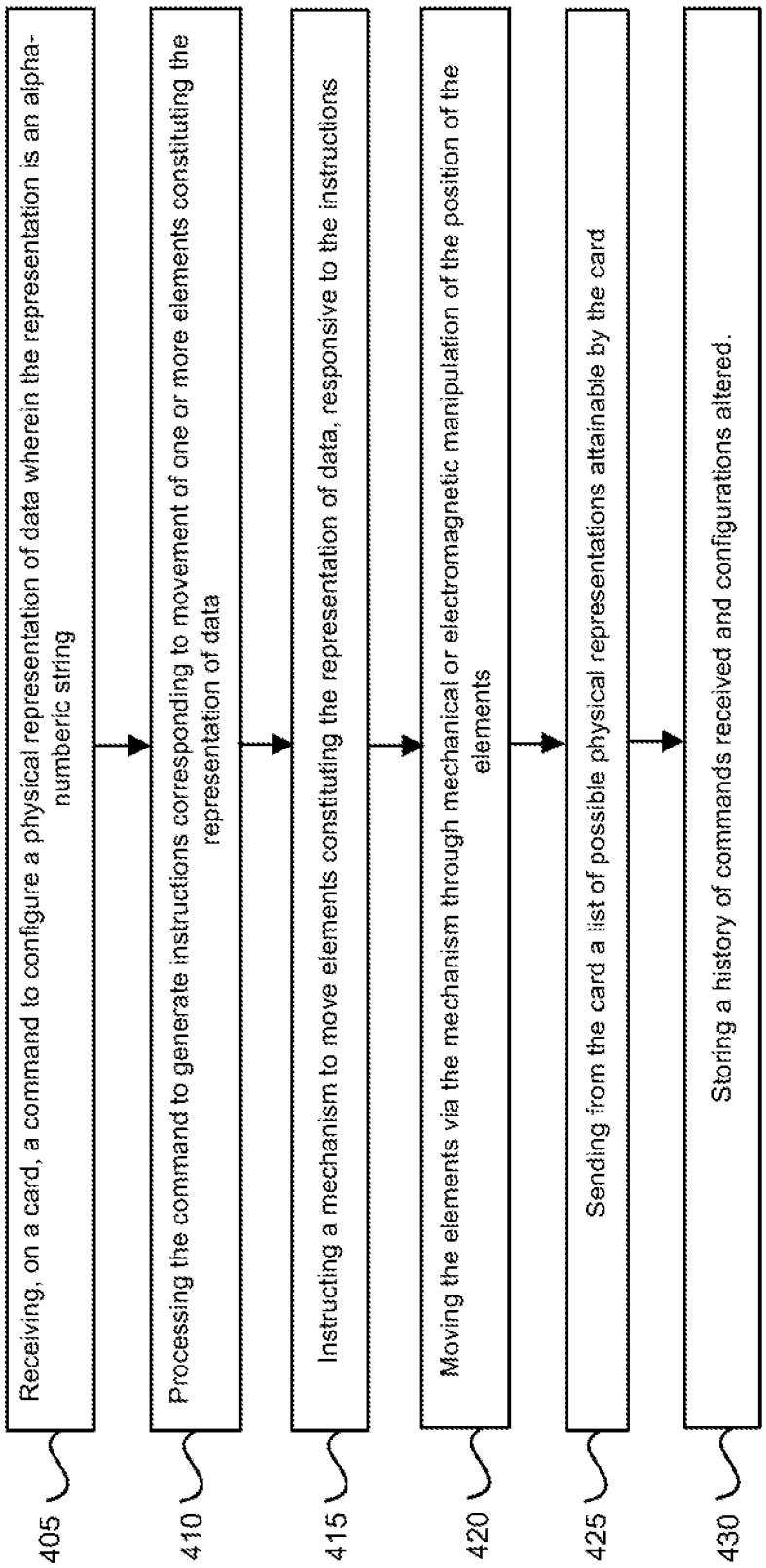
FIG. 4 illustrates an example embodiment of a method of the present disclosure.

FIG. 4 shows an exemplary flow diagram of a method 400 according to an example embodiment of the present disclosure. In step 405, a command can be received on a card having pins (e.g. pin 202) according to various embodiment of the invention such that the card can configure the physical representation of data shown on the card. This representation can be an alphanumeric representation. The command can contain additional information such as encryption and verification information to ensure that the command is coming from an authorized source. This command can be generated by a server (e.g., server 300) in response to a user request, generated automatically by, or generated periodically to ensure a continually changing credit card. In step 410, the received command can be processed to generate instructions corresponding to the movement of one or more elements constituting the representation of data. As an example, the command received from the server can be a general command, and the chip can transform the command, or generate instructions, specific to the hardware contained in the chip. Step 415 consists of instructing a mechanism, for example, to move elements (e.g., one or more pins, for example) constituting the representation of data, responsive to the instructions. This can for example consist of a circuit similar to circuit 230, for example, relaying specific information, signals, or power to an electromagnet similar to electromagnet 250 and/or micromotor 260 to perform specific actions. Step 420 may include moving elements via the mechanism through mechanical or electromagnetic manipulation of the position of the elements. This can include electromagnet 250 or micromotor 260 moving the mechanism. Step 425 can may include sending from the card a list of possible physical configurations attainable by the card. This list can be based on the mutable elements present in the card. This list can also be based on the physical configuration of the mutable elements present in the card, such as the number of components comprising a particular digit, such as digit 201A. This list can be sent through chip 210 for example. Step 430 can consist of storing a history of commands received and the configurations altered on the card.

Figure 5:
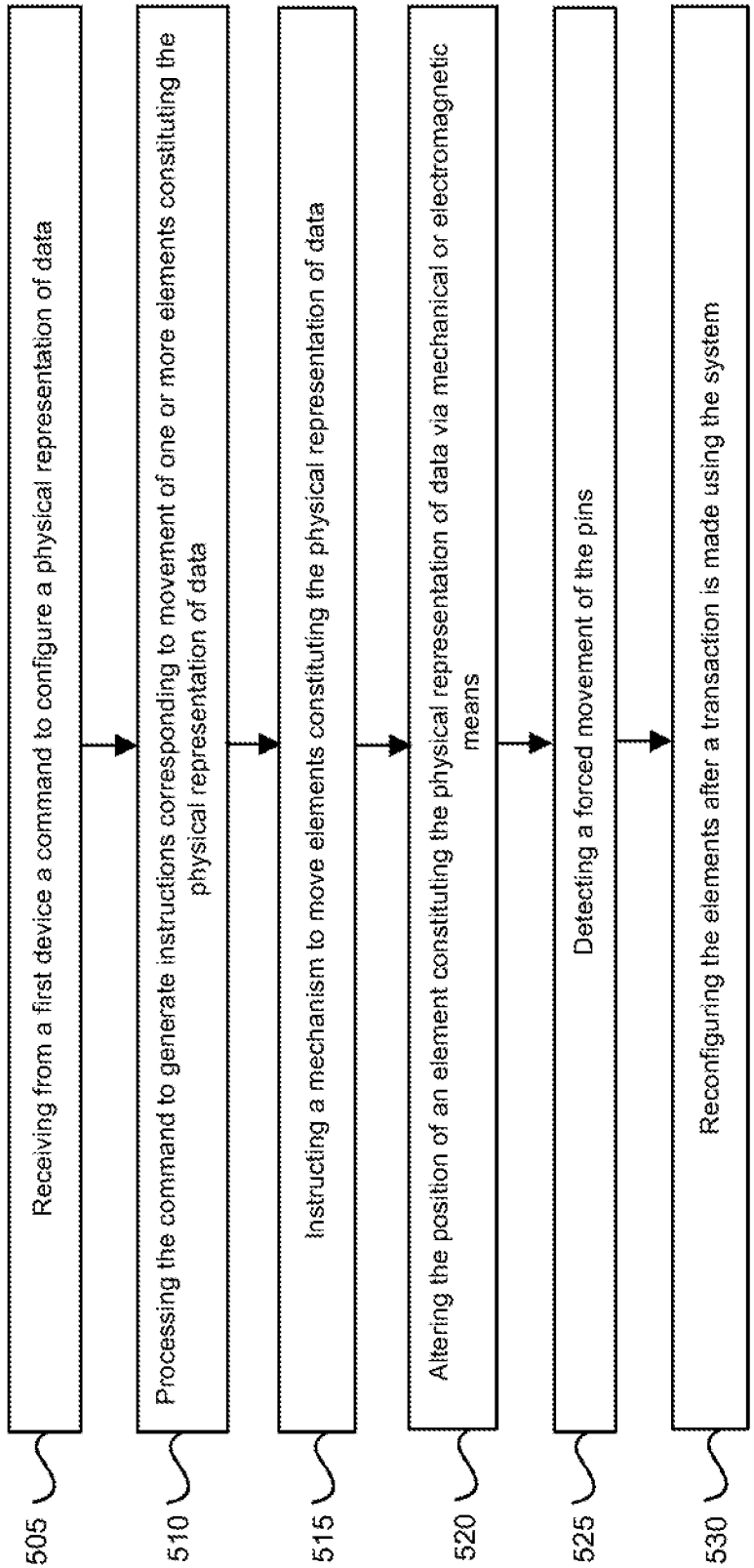
FIG. 5 illustrates an example embodiment of a method of the present disclosure.

FIG. 5 shows an exemplary flow diagram of a method 500 according to an example embodiment of the present disclosure. In step 505, a command can be received on a card having pins (such as pin 202) according to various embodiment of the invention such that the card can configure the physical representation of data shown on the card. This representation can be an alphanumeric representation.

The command can contain additional information such as encryption and verification information to ensure that the command is coming from an authorized source. This command can be generated by a (e.g. server 300) in response to a user request, generated automatically by, or generated periodically to ensure a continually changing credit card.

In some examples, the command can be generated in response to the card's entry into a communication field, such as an NFC field. Upon entry into the field, or upon receipt of a read request, the card can generate a near-field data exchange format (NDEF) tag that contains encrypted data in a prescribed format (e.g., a cryptogram). The data may be encrypted in a manner known both to the card and the card reader, including symmetric encryption and public/private key encryption. Upon a second entry into the field, or upon receipt of a second read request, the encrypted data can be transmitted from the card to the reader for decryption and interpretation of the command. This process can be carried out as shown and described in the previously-referenced U.S. patent application Ser. No. 16/205,119, the entire contents of which is incorporated herein.

In step 510, the received command can be processed to generate instructions corresponding to the movement of one or more elements constituting the representation of data. As an example, the command received from the server 300 can be a general command, and the chip can transform the command, or generate instructions, specific to the hardware contained in the chip. Other rules can be added in this step, such as ensuring that the given card has been active for a certain number of days, or the account associated with a particular card (e.g. card 200) has been active for a length of time or activated and authorized. Step 515 consists of instructing a mechanism to move elements constituting the representation of data, responsive to the instructions. This can for example consist of a circuit (e.g. circuit 230) relaying specific information, signals, or power to an electromagnet (e.g. electromagnet 250) and/or a micromotor (e.g. micromotor 260) to perform specific actions. Step 520 consists of moving elements via the mechanism through mechanical or electromagnetic manipulation of the position of the elements. This can consist of the electromagnet or the micromotor moving the mechanism. Step 525 can consist of detecting a forced movement of the pins. This can be done through circuit elements (e.g. circuit element 231) detecting a physical change in the device when a command is not sent from the chip. Step 530 can consist of reconfiguring the elements on the card when a transaction is made using the card. In an example embodiment, this can be achieved by a chip (e.g. chip 210) generating commands to achieve the reconfiguration based on a detection of a transaction being made.

Figure 6:
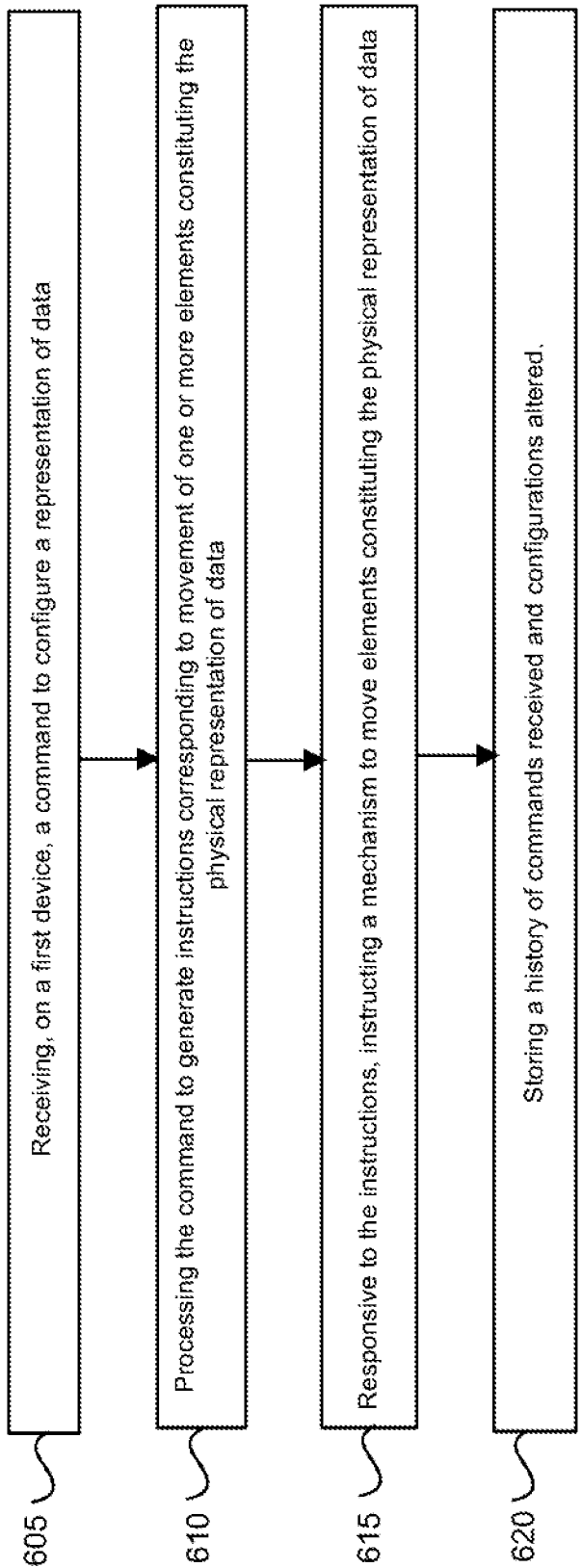
FIG. 6 illustrates an example embodiment of a method of the present disclosure.

FIG. 6 shows an exemplary flow diagram of a method 600 according to an example embodiment of the present disclosure. In step 605, a command can be received on a card such that the card can configure the physical representation of data shown on the card. This representation can be an alphanumeric representation. The command can contain information such as encryption and verification information to ensure that the command is coming from an authorized source. This command can be generated by a server (e.g. server 300) in response to a user request, generated automatically by, or generated periodically to ensure a continually changing credit card. In step 610, the received command can be processed to generate instructions corresponding to the movement of one or more elements constituting the representation of data. As an example, the command received from the server can be a general command, and the chip can transform the command, or generate instructions, specific to the hardware contained in the chip. Step 615 consists of instructing a mechanism to move elements constituting the representation of data, responsive to the instructions. This can for example consist of a circuit (e.g. circuit 230) relaying specific information, signals, or power to an electromagnet (e.g. electromagnet 250) and/or a micromotor (e.g. micromotor 260) to perform specific actions. Step 620 can consist of reconfiguring the elements on the card when a transaction is made using the card. In an example embodiment, this can be achieved by a chip (e.g. chip 210) generating commands to achieve the reconfiguration based on a detection of a transaction being made.

Further, in various embodiments, with reference back to FIG. 2, chip 210 of card 200 may contain additional logic which further modifies the transfer of information and the representations possible on the card. For instance, the logic may limit the number of transfers that a transfer device may perform within a period of time. As another example, the logic may only allow the transfer of information to occur to a certain amount of types of information. In the financial context, this may mean only allowing the transfer of information between certain accounts of the transferor, various accounts that may be linked with the user of the card, or only allowing for accounts up to a certain monetary value to be represented or accessed on the card.

In an example embodiment, if a command is received, or a fraudulent transaction is detected, the record or data intended to be represented by the card could be destroyed. This can be done by for example changing the card to a default position, such as a string of zeros. In another example, the card could read an alphanumeric string to represent that the card is void, such as "V-O-I-D" or "N-U-L-L". In one example, such a default configuration can be set after a certain number of days have transpired from the last time the card 200 has synchronized with a server 300. In another example, the default position can be generated based on a certain number of transactions that have occurred within a pre-determined time period. In another example, the default position can be generated when the card detects a number of fraudulent or failed transactions. In an example embodiment, only certain records or data may selectively be nullified, destroyed, or voided on the device. For instance, records related to the user name or expiration date can be made null when the card is not in use.

In addition to the use of physical pins, the representation of a card number, or other information, can be done partially through the use of electronic paper. Electronic paper can consist of a flexible display that is responsive to electronic commands received. The commands can indicate what to display. Thus, the card number can be represented to a user of the card as a combination of electronic paper and physical pins. Electronic ink can be vulnerable to failure in various situations, including in highly magnetized environments. By utilizing example embodiments of the present disclosure that lock the pins into place, these vulnerabilities can be reduced.

The present disclosure is not to be limited in terms of the particular embodiments described in this application, which are intended as illustrations of various aspects. Many modifications and variations may be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for moving physical elements of a card, wherein the card comprises a chip, a communication interface, one or more physical elements constituting a physical representation of data in the form of an alpha-numeric string, and a mechanism, the method comprising:
   receiving, via the communication interface, a command to configure the physical representation of data;
   processing, by the chip, the command to generate movement instructions corresponding to movement of at least one of the one or more physical elements constituting the representation of data;
   responsive to the movement instructions, instructing, by the chip, the mechanism to move the at least one of the one or more physical elements constituting the physical representation of data; and
   moving, by the mechanism, the at least one of the one or more physical elements through mechanical or electromagnetic manipulation of a position of the at least one of the one or more physical elements.

2. The method of claim 1, wherein the physical representation of data is created through the use of fixed-shape elements.

3. The method of claim 2, wherein the data represented is a 16-digit credit card number.

4. The method of claim 3, wherein the command to configure the physical representation of data is received via Near-Field Communication.

5. The method of claim 2, wherein the one or more physical elements constituting the physical representation of data are substantially t-shaped pins.

6. The method of claim 2, wherein the command to configure the physical representation of data is encrypted.

7. The method of claim 2, further comprising automatically updating the physical representation of data to a void configuration stored on the card.

8. The method of claim 1, further comprising sending from the card via the communication interface a list of possible physical representations of data attainable by the card.

9. The method of claim 1, further comprising storing a history of commands received and configurations altered.

10. The method of claim 1, further comprising sending from the card via the communication interface a message about a current configuration to a first device.

11. The method of claim 1, further comprising automatically updating the physical representation of data upon a pre-determined number of uses of the card.

12. The method of claim 1, wherein the physical elements include semi-permanent electronic paper.

13. A system, comprising:
a card;
one or more physical elements constituting a physical representation of information on the card;
a mechanism configured to move the physical elements; and
an electronic chip configured to:
automatically receive from a first device a command to configure a physical representation of information;
process the command to generate movement instructions corresponding to movement of the one or more physical elements constituting the physical representation of information; and
instruct the mechanism to move one or more physical elements constituting the physical representation of information; and
the mechanism configured to:
alter a position of the one or more physical elements constituting the physical representation information data via mechanical or electromagnetic means.

14. The system of claim 13, wherein a portion of the one or more physical elements has different optical properties than the remaining portion of the one or more physical elements.

15. The system of claim 14, wherein 7 pins are arranged in a figure-8 shape.

16. The system of claim 15, wherein the system is further configured to detect a forced movement of the pins.

17. The system of claim 14, wherein the one or more physical elements are moved via an electromagnetic array.

18. The system of claim 14, wherein the system is further configured to be operable only in the presence of an external power source.

19. The system of claim 14, wherein the system is configured to reconfigure the one or more physical elements after a transaction is made using the system.

20. A non-transitory computer-accessible medium having stored thereon computer-executable instructions, wherein, when a computer arrangement comprising a chip, a memory, a communication interface, one or more physical elements constituting a physical representation of data in the form of an alpha-numeric string, and a mechanism executes the instructions, the computer arrangement is configured to perform procedures comprising:
receiving, via the communication interface, a command to configure a representation of data;
processing, by the chip, the command to generate movement instructions corresponding to movement of at least one of the one or more physical elements constituting the physical representation of data;
responsive to the movement instructions, instructing, by the chip, the mechanism to move at least one of the one or more physical elements constituting the physical representation of data; and
storing, by the chip in the memory, a history of commands received and configurations altered.

* * * * *